(12) United States Patent
Skovronski et al.

(10) Patent No.: US 6,565,279 B1
(45) Date of Patent: May 20, 2003

(54) CLAMP FOR PIPES OR FOR OTHER CYLINDRICAL STRUTS

(75) Inventors: Jonathan Skovronski, Paddock Lake, WI (US); Paul Rumachik, Kenosha, WI (US)

(73) Assignee: Kiefer Pool Equipment Co., Zion, IL (US)

( * ) Notice: Subject to any disclaimer, the term of this patent is extended or adjusted under 35 U.S.C. 154(b) by 27 days.

(21) Appl. No.: 10/047,790

(22) Filed: Jan. 14, 2002

(51) Int. Cl.[7] .................................................. E04G 7/00
(52) U.S. Cl. ....................... 403/192; 403/344; 403/231; 403/256; 403/403; 256/65.05
(58) Field of Search ................................. 403/344, 289, 403/341, 290, 230, 231, 234, 256, 258, 260, 261, 187, 188, 192, 403, 382, 385, 373, 374.3, 396, 313; 256/65.01, 65.04, 65.05

(56) References Cited

U.S. PATENT DOCUMENTS

| | | | | |
|---|---|---|---|---|
| 889,223 A | * | 6/1908 | Graham | 403/187 X |
| 1,522,309 A | * | 1/1925 | McEwen | 403/176 |
| 2,711,917 A | * | 6/1955 | Blu | 403/373 X |
| 6,298,629 B1 | * | 10/2001 | Ador | 403/385 X |
| 6,343,891 B1 | * | 2/2002 | Combs | 403/385 X |

* cited by examiner

Primary Examiner—Lynne H. Browne
Assistant Examiner—John R. Cottingham
(74) Attorney, Agent, or Firm—Wood, Phillips, Katz, Clark & Mortimer

(57) ABSTRACT

For clamping one end of a first, cylindrical strut to a second, cylindrical strut crossing the end of the first strut, a clamp comprising two clamping members, each having a first portion adapted to fit one half of the end of the first strut and a second portion unitary with its first portion and adapted to fit one half of the second strut. Each clamping member has a reinforcing rib extending along its first clamping portion and extending onto its second clamping portion. Embossments of the reinforcing rib of each clamping member define margins of fastener-receiving apertures, which receive fasteners drawing the respective members tightly around the respective struts.

7 Claims, 3 Drawing Sheets

CLAMP FOR PIPES OR FOR OTHER CYLINDRICAL STRUTS

TECHNICAL FIELD OF THE INVENTION

This invention pertains to a clamp comprising two clamping members, which may be substantially identical, of a type that is used for clamping one end of a first, cylindrical strut, such as a pipe, tube, or bar, to a second, cylindrical strut, such as a pipe, tube, or bar, which crosses the end of the first strut. As provided by this invention, each clamping member has a reinforcing rib, which resists tendencies of said clamping member to splay.

BACKGROUND OF THE INVENTION

In a specialized application of clamps of the type noted above, such clamps have been used to clamp substantially horizontal braces to substantially vertical legs, for lifeguard's chairs for swimming pools. Fasteners, such as bolts, have been used to fasten the clamping members of such clamps to each other. Such clamps using such fasteners have been used, rather than welded joints, so as to permit such chairs from time to time to be easily disassembled for removal and to be easily reassembled for usage of such chairs. As known heretofore, the clamping members of such clamps have tended to splay under heavy loads, whereby such clamps have proved not to be entirely satisfactory.

SUMMARY OF THE INVENTION

This invention provides an improved clamp of the type noted above, for clamping one end of a first, cylindrical strut, such as a pipe, tube, or bar, to a second, cylindrical strut, such as a pipe, tube, or bar, which crosses the end of the first strut. The improved clamp comprises two clamping members, which may be substantially identical. Each clamping member has a first portion, which is adapted to fit along and around approximately one half of the end of the first strut, preferably with an interference fit, and a second portion, which is unitary with the first clamping portion of said clamping member and which is adapted to fit along and around approximately one half of the second strut, preferably with an interference fit. Each clamping member has a first fastener-receiving aperture in the first portion of said clamping member and a second fastener-receiving aperture in the second portion of said clamping member.

The improved clamp further comprises means including a first fastener, which is received by the first fastener-receiving apertures of the respective members, to draw the first portions of the respective members tightly around the end of the first strut, and means including a second fastener, which is received by the second fastener-receiving apertures of the respective members, to draw the second portions of the respective members tightly around the second strut. As improved by this invention, each clamping member has a reinforcing rib, which extends along the first portion of said clamping member and which extends onto the second portion of said clamping member.

Preferably, the reinforcing rib of each clamping member merges with a first embossment, which defines a margin of the first fastener-receiving aperture of said clamping member, and with a second embossment, which defines a margin of the second fastener-receiving member of said clamping member. Preferably, moreover, the second embossment of each clamping member is located on the second clamping portion of said clamping member. Preferably, moreover, the second embossment of each clamping member has a nose extending more than halfway around the second clamping portion of said clamping member.

In a preferred embodiment, the first clamping portion of each clamping member has a proximal end, at which the first clamping portion of said clamping member merges with the second clamping portion of said clamping member, and a distal end, from which the reinforcing rib of said clamping member is spaced.

Although a clamp embodying this invention has been developed for the specialized application noted above, it is anticipated that a clamp embodying this invention may prove to be useful in a wide variety of similar and dissimilar applications.

BRIEF DESCRIPTION OF THE DRAWINGS

FIGS. 5, 6, and 7 comprise serial views, which are analogous to FIG. 3 but which illustrate the first pipe in cross-section and both camping members, and which illustrate how interference fits are effected when the clamp is used.

DETAILED DESCRIPTION OF THE ILLUSTRATED EMBODIMENTS

Figure 1:
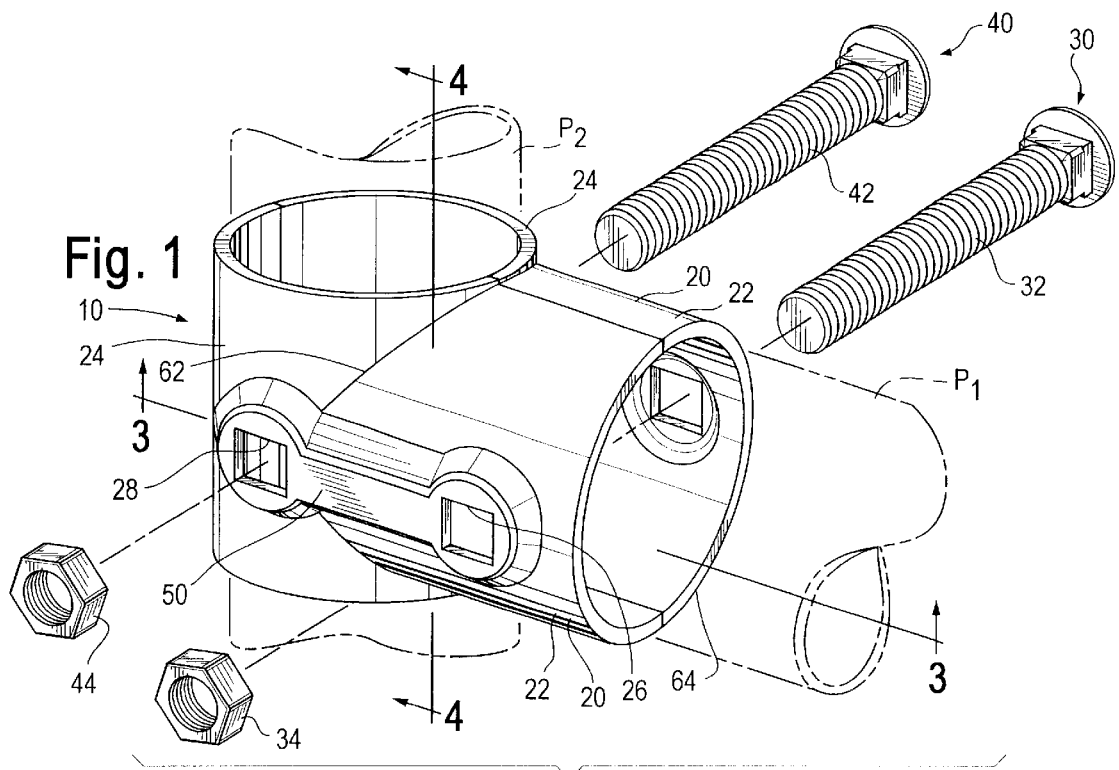
FIG. 1 is a perspective view of a clamp comprising two clamping members and constituting a preferred embodiment of this invention, as used to clamp one end of a first pipe to a second pipe crossing the end of the first pipe. The first and second pipes are illustrated fragmentarily, in broken lines, and two fasteners used to draw the clamping members together are illustrated.
Figure 2:
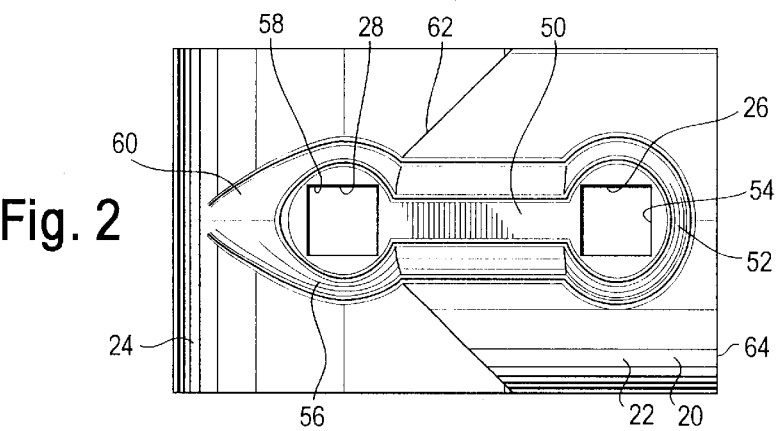
FIG. 2 is an elevation of one of the clamping members, as seen from what is its outside when used.
Figure 3:
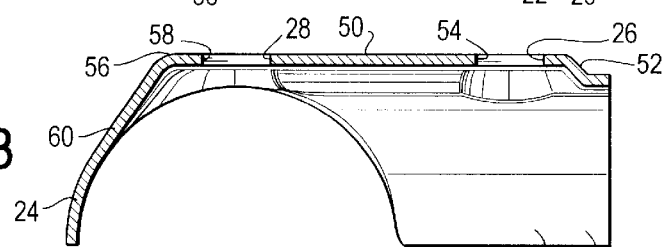
FIGS. 3, 4, and 5 are sectional views thereof, as taken respectively along lines 1—1, 2—2, and 3—3 in FIG. 1, in directions indicated by arrows.
Figure 4:
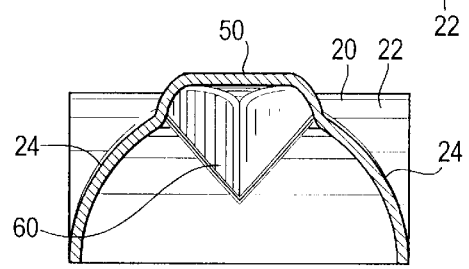

As illustrated in FIG. 1 and other views, a clamp 10 comprising two substantially identical clamping members 20 and constituting a preferred embodiment of this invention is used to clamp one end of a first pipe $P_1$ to a second pipe $P_2$ crossing the end of the first pipe $P_1$. In the specialized application noted above, the first pipe $P_1$ may be a substantially horizontal brace of a lifeguard's chair and the second pipe $P_2$ may be a substantially vertical leg of the lifeguard's chair.

Each clamping member 20 is stamped from stainless steel so as to have a first portion 22, which is adapted to fit along and around approximately one half of the end of the first pipe $P_1$, and a second portion 24, which is unitary with the first clamping portion 22 of said clamping member 20 and which is adapted to fit along and around approximately one half of the second pipe $P_2$. Each clamping member 20 is stamped so as to have a first fastener-receiving aperture 26 in its first portion 22 and a second fastener-receiving aperture 28 in its second portion 24.

The clamp 10 further comprises a first fastener 30 comprising a first bolt 32, which is received by the first fastener-receiving apertures 26 of the respective members 20 and by aligned apertures (not shown) in the end of the first pipe $P_1$, and comprising a first nut 34, which is threaded onto the first bolt 32, to draw the first portions 22 of the respective members 20 tightly around the end of the first pipe P₁. The clamp 10 further comprises a second fastener 40 comprising a second bolt 42, which is received by the second fastener-receiving apertures 28 of the respective members 20 and by aligned apertures (not shown) in the second pipe P₂, and comprising a second nut 44, which is threaded onto the second bolt 42, to draw the second portions 24 of the respective members 20 tightly around the second pipe P₂. The respective fasteners 30, 40, are made of stainless steel.

As improved by this invention, each clamping member 20 has a reinforcing rib 50, which projects outwardly, which extends along its first portion 22, and which extends onto its second portion 24. The reinforcing rib 50 of each clamping member 20 merges with a first embossment 52, which defines a margin 54 of the first fastener-receiving aperture 26 of said clamping member 20, and with a second embossment 56, which defines a margin 58 of the second fastener-receiving aperture 28 of said clamping member 20 and which is located on the second clamping portion 24 of said clamping member 20. The second embossment 56 has a nose 60 extending more than half way around the second clamping portion 24 of said clamping member 20. The first clamping portion 22 of each clamping member 20 has a proximal end 62, at which the first clamping portion 22 of said clamping member 20 merges with its second clamping portion 24, and a distal end 64, from which the reinforcing rib 50 of said clamping member 20 is spaced.

Figure 5:
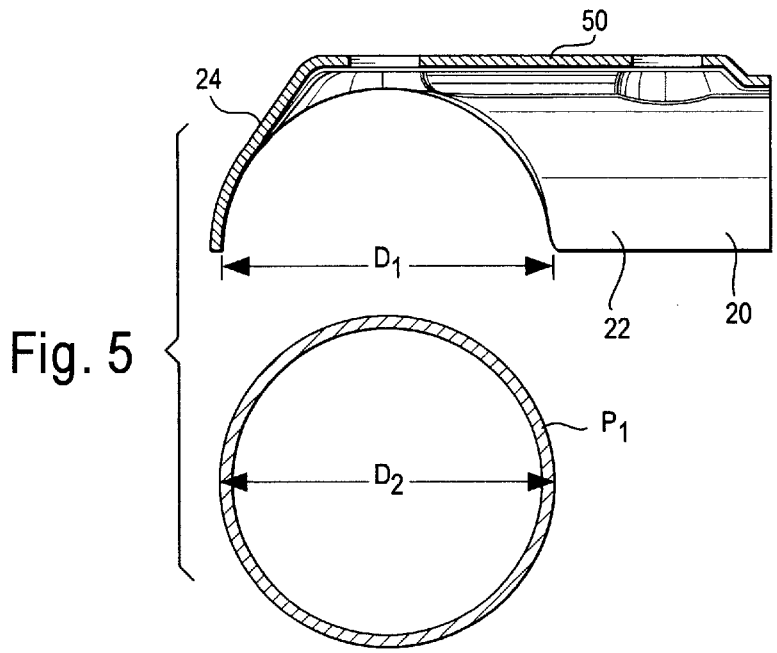
Figure 6:
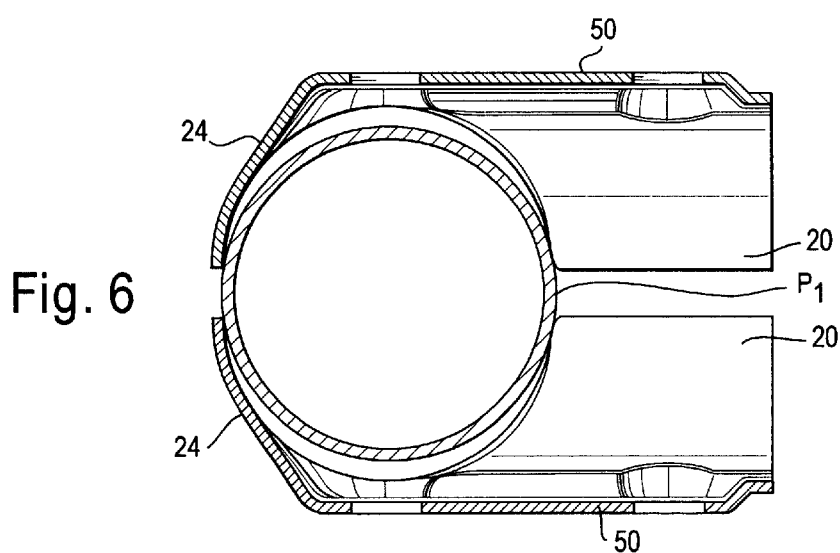
Figure 7:
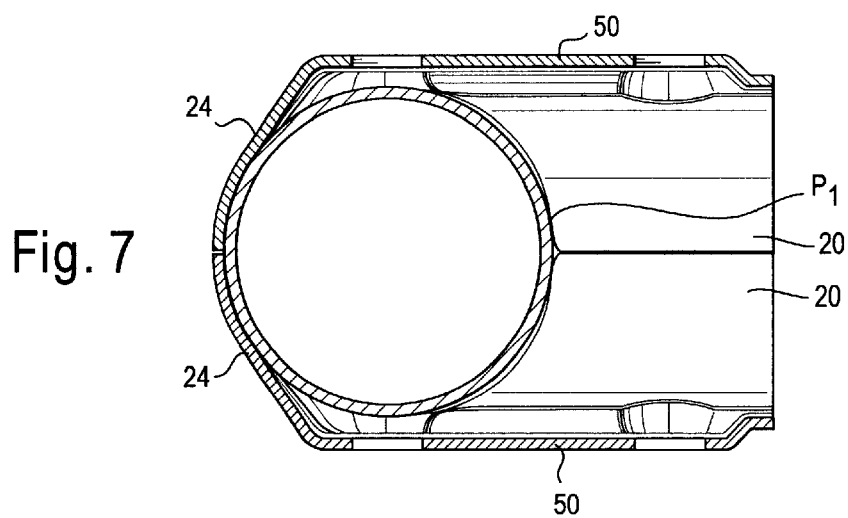

Each clamping member 20 is stamped so that each of the respective portions 22, 24, of each clamping member 20 has an inner diameter, when unstressed, which is a few percent smaller than the outer diameter of the associated pipe. As an example illustrated in FIGS. 5, 6, and 7, each second portion 24 has an inner diameter $D_1$, when unstressed, which is a few percent smaller than the outer diameter $D_2$ of the second pipe P₂. Thus, interference fits are effected when the respective portions 22, 24, of said clamping member 20 are tightened around the associated pipes.

Advantageously, on each clamping member 20, the reinforcing rib 50 resists tendencies of said clamping member 20 to splay under a heavy load, particularly but not exclusively where the first clamping portion 22 merges with the second clamping portion 24 and where the second clamping portion 24 is reinforced by the nose 60 of the second embossment 56 of the reinforcing rib 50.

Figure 8:
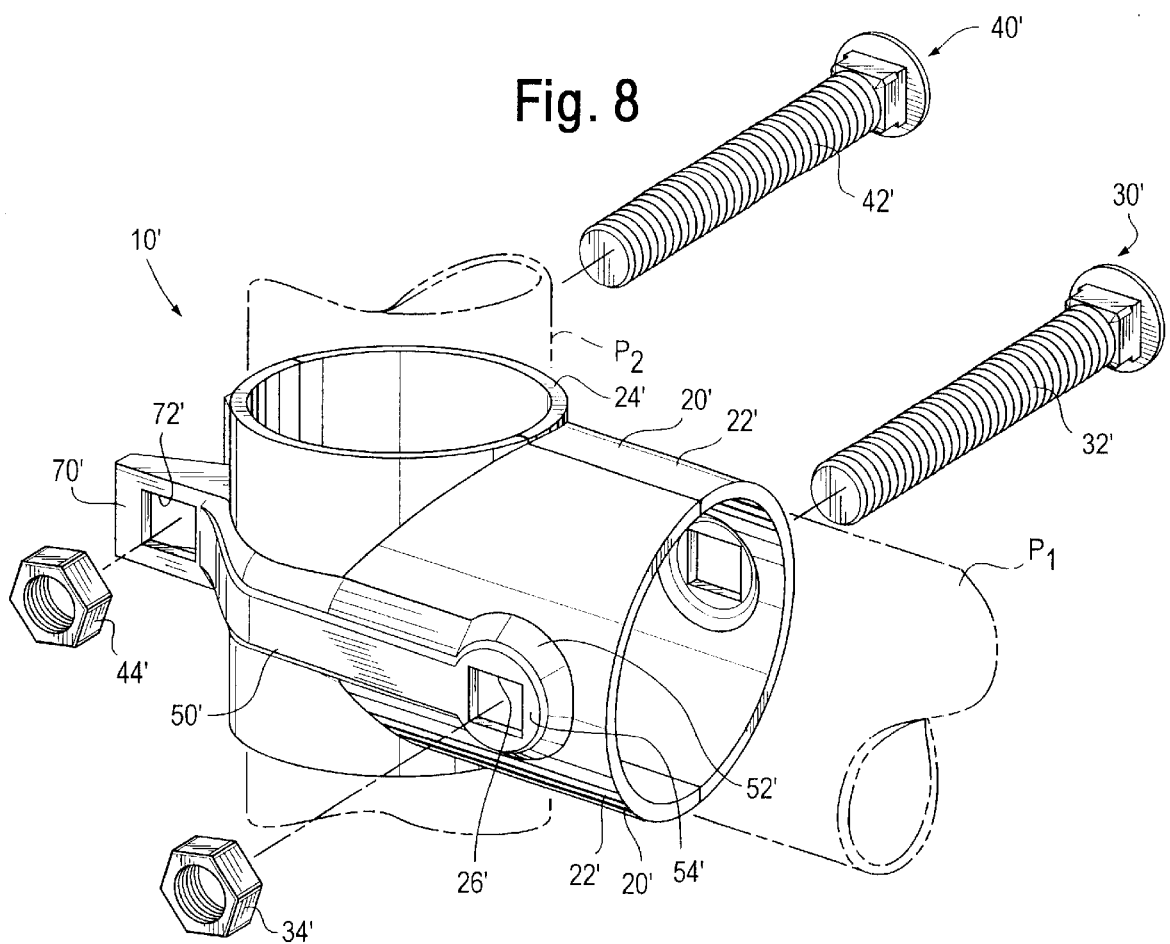
FIG. 8 is a perspective view, which is analogous to FIG. 1 but which illustrates a clamp constituting an alternative embodiment of this invention.
Figure 9:
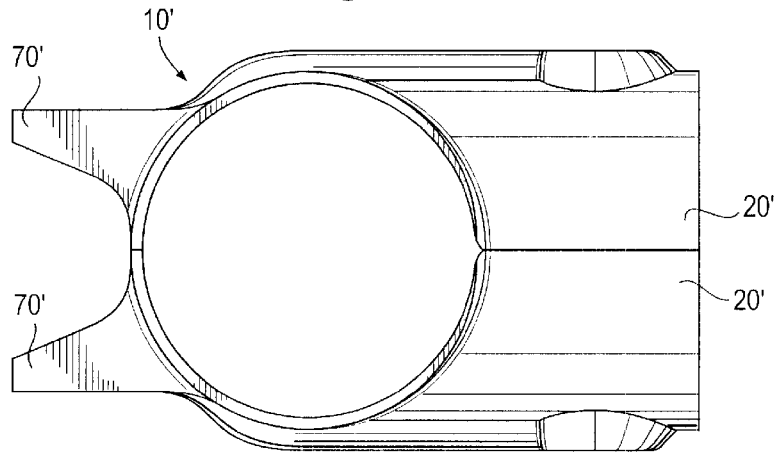
FIG. 9 is a plan view of the clamp of FIG. 8.

As illustrated in FIGS. 8 and 9, a clamp 10' comprising two clamping members 20' and constituting an alternative embodiment of this invention is used, as the clamp 10 is used, to clamp one end of a first pipe P₁ to a second pipe P₂ crossing the end of the first pipe P₁. Except as illustrated and described, the clamp 10' is similar to the clamp 10 and is used similarly.

Each clamping member 20' is stamped from stainless steel so as to have a first portion 22', which is similar to the first portion 22 of the each clamping member 20 and which thus has a first fastener-receiving aperture 26', and a second portion 24', which is similar to the second portion 24 of each clamping member 20, except that the second portion 24' has a boss 70', which has a second fastener-receiving aperture 72'.

The clamp 10' further comprises a first fastener 30' comprising a first bolt 32', which is received by the first fastener-receiving apertures 26' of the respective members 20' and by aligned apertures (not shown) in the end of the first pipe P₁, and comprising a first nut 34', which is threaded onto the first bolt 32', to draw the first portions 22' of the respective members 20' tightly around the end of the first pipe P₁. The clamp 10' further comprises a second fastener 40' comprising a second bolt 42', which is received by the second fastener-receiving apertures 72' of the respective members 20' but does not extend through apertures in the second pipe P₂, and comprising a second nut 44', which is threaded onto the second bolt 42', to draw the second portions 24' of the respective members 20' tightly around the second pipe P₂. The respective fasteners 30', 40', are made of stainless steel.

Moreover, each clamping member 20' has a reinforcing rib 50', which is similar to the reinforcing rib 50 of each clamping member 20 and which thus has a first embossment 52' defining a margin 54' of the first fastener-receiving aperture 26' of said clamping member 20', except that the reinforcing rib 50' does not have a second embossment comparable to the second embossment 56 of the reinforcing rib 50 of each clamping member 20.

What is claimed is:

1. For clamping one end of a first, cylindrical strut to a second, cylindrical strut crossing the end of the first strut, a clamp comprising two clamping members, each clamping member having a first portion adapted to fit along and around approximately one half of the end of the first strut, each clamping member having a second portion unitary with the first clamping portion of said clamping member and adapted to fit along and around approximately one half of the second strut, each clamping member having a first fastener-receiving aperture in the first portion of said clamping member, each clamping member having a second fastener-receiving aperture in the second portion of said clamping member, the clamp further comprising means including a first fastener, which is received by the first fastener-receiving apertures of the respective members and by aligned apertures in the end of the first strut when the clamp is used, to draw the first portions of the respective members tightly around the end of the first strut, the clamp further comprising means including a second fastener, which is received by the second fastener-receiving apertures of the respective members and by aligned apertures in the second cylindrical strut when the clamp is used, to draw the second portions of the respective members tightly around the second strut, each clamping member having a reinforcing rib, which extends along the first portion of said clamping member and which extends onto the second portion of said clamping member, wherein the reinforcing rib of each clamping member includes a first embossment defining a margin of the first fastener-receiving aperture of said clamping member and wherein the reinforcing rib of each clamping member includes a second embossment defining a margin of the second fastener-receiving aperture of said clamping member.

2. The clamp of claim 1 wherein the second embossment of the reinforcing rib of each clamping member is located on the second clamping portion of said clamping member.

3. The clamp of claim 2 wherein the second embossment of each clamping member has a nose extending more than halfway around the second claiming portion of said clamping member.

4. The clamp of claim 1 wherein the first clamping portion of each clamping member has a proximal end, at which the first claiming portion of said clamping member merges with the second clamping portion of said clamping member, and wherein the first clamping portion of each clamping member has a distal end, from which the reinforcing rib of said clamping member is spaced.

5. The clamp of claim 2 wherein the first clamping portion of each clamping member has a proximal end, at which the first clamping portion of said clamping member merges with the second clamping portion of said clamping member, and wherein the first clamping portion of each clamping member has a distal end, from which the reinforcing rib of said clamping member is spaced.

6. The clamp of claim 3 wherein the first clamping portion of each clamping member has a proximal end, at which the first clamping portion of said clamping member merges with the second clamping portion of said clamping member, and wherein the first clamping portion of each clamping member has a distal end, from which the reinforcing rib of said clamping member is spaced.

7. The clamp of any preceding claim wherein each of the first and second clamping portions is adapted to fit around the associated pipe with an interference fit.

* * * * *